Nov. 8, 1960   W. L. G. HEUSNER   2,959,438
CONNECTION OF FOLDABLE CAPS
Filed March 13, 1959   2 Sheets-Sheet 1

INVENTOR.
Wilhelm Ludwig Gustav Heusner
BY
Patent Agent

Nov. 8, 1960 W. L. G. HEUSNER 2,959,438
CONNECTION OF FOLDABLE CAPS
Filed March 13, 1959 2 Sheets-Sheet 2

INVENTOR.
Wilhelm Ludwig Gustav Heusner
BY
Patent Agent

United States Patent Office 2,959,438
Patented Nov. 8, 1960

2,959,438

CONNECTION OF FOLDABLE CAPS

Wilhelm Ludwig Gustav Heusner, Bochum-Weitmar, Germany, assignor to Hermann Schwarz Kommanditgesellschaft, Wattenscheid, Germany Filed Mar. 13, 1959, Ser. No. 799,279

Claims priority, application Germany Mar. 18, 1958

6 Claims. (Cl. 287—99)

The present invention relates to caps for use in connection with mining and especially to a connection of foldable or pivotally arranged caps or sow irons for use in connection with the building of mine shafts. More specifically, the present invention concerns a cap connection in which one cap is provided with an extension which is adapted to be tilted about a bearing arranged in the fork of another cap. The extension of one cap and the fork of the other cap are provided with protrusions, cams and noses on one hand and recesses, grooves and the like on the other hand. The arrangement is such that the said protrusions etc. engage the said recesses etc. in such a way and are so designed that in operative position of said parts, the two caps are interlocked, whereas in folded position, the two caps can be pulled apart.

The present invention concerns such cap connections of the above mentioned general type in which the stud-like parts at the end of the extension are located opposite to each other and engage the groove of a transverse bearing passed through the fork. The groove of said transverse bearing may, if desired, be inclined so that when the transverse bearing is moved inwardly, the end of the extension will move downwardly whereby the cap will press against the overburden.

It is, therefore, an object of the present invention with a cap connection of the above mentioned general type to reduce the length of the groove to a minimum and consequently also to reduce the length of the transverse bearing.

It is a further object of this invention so to design a cap connection of the type involved that the cap connection will be narrow while the transverse bearing will be prevented from protruding when in unlocked condition.

These and other objects and advantages of the invention will appear more clearly from the following specification in connection with the accompanying drawing, in which.

*General arrangement*

Figure 1:
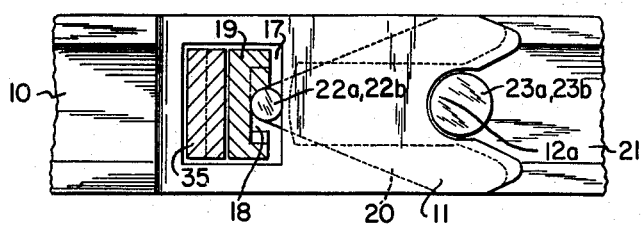
Fig. 1 is a diagrammatic side view of two inter-engaged cap ends with fork and extension and shows in section the transverse bearing with clamping element.

The arrangement according to the present invention is characterized primarily in that the transverse bearing provided with an inclined groove rests against a clamping element which latter is so designed and movably journalled in such a way that when the clamping element is moved for instance displaced or inserted, the distance between the transverse bearing in one cap and the extension member on the other cap will be varied so that a displacement of the transverse bearing in the longitudinal direction of the cap will be effected. Preferably, the displacement of the transverse bearing caused by the displacement of the clamping element is such that in one end position of the clamping element, the stud-like extensions of one cap will automatically be guided in the groove of the transverse beam in such a way that the said stud-like extensions will be lifted or lowered during a transverse movement of the bearing, whereas in the other position of the clamping element, the transverse bearing may be brought into a position in which the said stud-like extensions will be located outside the groove of the bearing so that the extensions are adapted to move freely upwardly and downwardly and that the cap provided with the extensions is free to tilt.

In order to make possible such displacement of the bearing in the longitudinal direction of the caps, preferably a clamping element is selected which rests against the transverse bearing and which is likewise displaceable between two end bearings. In one end position of the clamping element, the bearing again occupies a position in which the stud-like extensions of the cap are automatically guided in the groove of the transverse bearing. In the other end position of the clamping element, the transverse bearing may be moved into a position in which the stud-like extensions will be located outside the groove of the transverse bearing.

The said clamping element may have the shape of a wedge and may be so designed that in one position the transverse bearing will be as close as possible to the other cap, whereas in its other position it may be as remote as possible from said cap so that it will be able to release the stud-like extensions of the other cap. When such clamping element is further inserted, the transverse bearing will be pressed against the stud-equipped extension of the other cap engaging the fork. When the clamping element is being pulled out, the transverse bearing can be pressed back, and the stud-like extensions will when leaving the groove of the transverse bearing be free to move in vertical direction.

A narrow and compact design can be obtained by cranking the wedge forming the clamping element in such a way that two wedging surfaces will be formed with relatively high inclination. Each of these wedging surfaces may rest against a supporting cam, and the supporting cams may be distributed over the width of the cap in uniformly spaced relationship with regard to the longitudinal central plane.

Such an arrangement and design has the important advantage that the preferably inclined groove engaged by the stud-like or otherwise designed extensions, for purposes of interlocking the caps or clamping the same against the overburden may be held relatively short. In this way, also the laterally more or less protruding transverse bearing can be reduced in length. The cap connection will as a result thereof remain narrow and be free of bulky connecting means which are undesired in view of the limited space in the undersurface mines.

*Structural arrangement*

Figure 2:
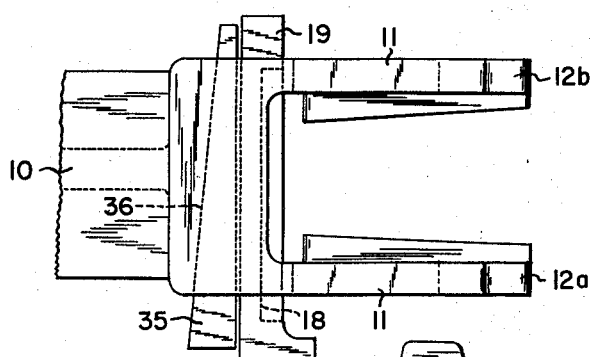
Fig. 2 is a top view of the left cap end in the arrangement of Fig. 1.

Referring now to the drawing in detail and to Figs. 1 and 2 thereof in particular, it will be noted from these figures that one end of the already built-in cap 10 is provided with a fork 11 having eyes 12a and 12b in which are tiltably journalled studs 23a and 23b pertaining to the extension 20 of the other cap 21. Stud-like extensions 22a, 22b connected to the outermost end of the extension 20 engage an inclined groove 18 of a transverse bearing 19 which latter has been inserted through a passage 17 and during its insertion clamps cap 21 against the overburden. It is into this passage 17 which is broadened, that on the back side of the transverse bearing 19 a wedge-shaped clamping element 35 is inserted in longitudinal direction of the transverse bearing 19. This clamping element 35 is adapted to slide on an inclined surface 36 within cap 10 and to bring about that during its insertion, the transverse bearing 19 will move in the direction toward the stud-like extensions 22a and 22b in the longitudinal direction of cap 10. When knocking out the clamping element 35, the latter will release the transverse bearing 19 so that the stud-like extensions 22a and 22b will be able to leave the inclined groove 18.

Figure 3:
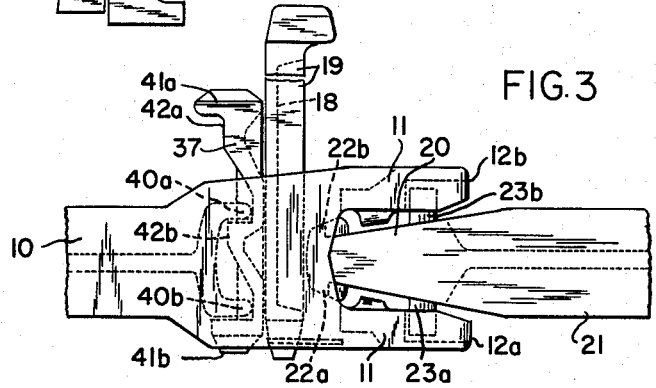
Fig. 3 is a top view of a modification according to the invention with a cranked wedge inserted behind the transverse bearing and occupying a non-clamping position.
Figure 4:
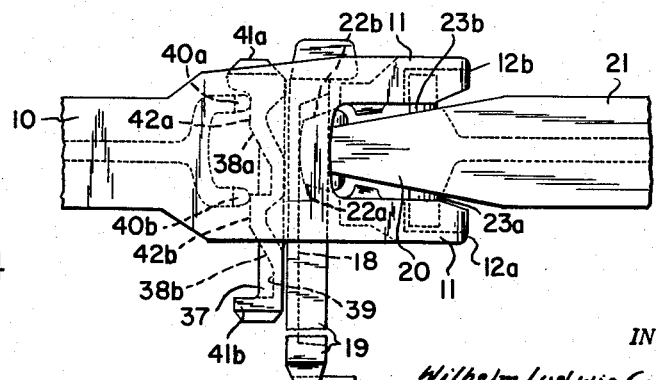
Fig. 4 is a top view of the arrangement of Fig. 3 in clamping condition.
Figure 4A:
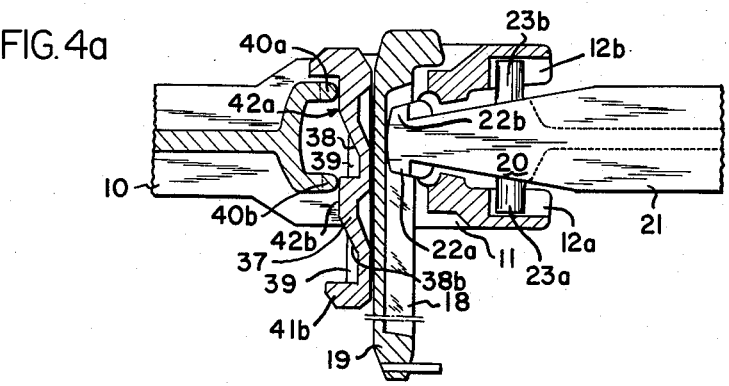
Fig. 4a is a horizontal section of the arrangement shown in Fig. 4.
Figure 4B:
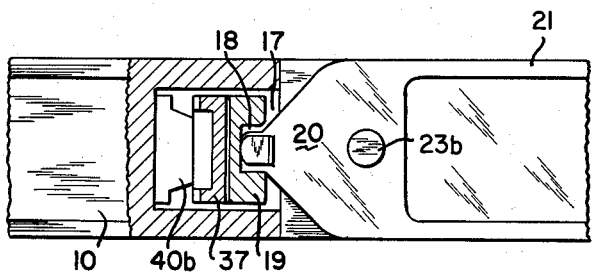
Fig. 4b is a vertical section of the same
Figure 4C:
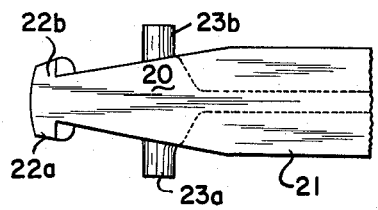
Fig. 4c is a top view of the right cap end in the arrangement of Fig. 4.

With the embodiment shown in Figs. 3 and 4, the clamping element 37 is cranked. In this way, it has two wedge surfaces 38a and 38b arranged one behind the other, each of which partly extends into a groove 39 and has a relatively great angle of inclination. The said wedge surfaces 38a, 38b will in released condition of wedge or clamping element 37 rest against a narrow supporting cam 40a and 40b respectively said cams being equally spaced from and located on opposite sides of the longitudinal central plane of the caps. In released condition, the supporting cams 40a and 40b are adapted partly to engage the two grooves 39. In this way, a pushing out of the clamping element from the cap will be prevented independently of the fact that the clamping element is at both ends provided with abutment noses 41a and 41b respectively. When the cranked clamping element 37 is being driven in, the supporting cams 40a and 40b will eventually rest against the straight supporting surfaces 42a and 42b of clamping element 37. In this way, the transverse bearing 19 will in its farthest position engage the abutment piece 20.

For purposes of clamping-in cap 21, first the transverse bearing 19 is pressed against the abutment 20 by means of the wedge-shaped clamping element 35 or 37 while the stud-like extensions 22a and 22b move into inclined groove 18. Thereupon, the transverse bearing 19 is hammered into fork 11 so that cap 21 will be pressed against the overburden. The length of the transverse bearing 19 and the groove 18 therein may be selected rather short.

It is, of course, to be understood that the present invention is, by no means, limited to the particular constructions shown in the drawing but also comprises any modifications within the scope of the appended claims. Thus, instead of a wedge-shaped clamping element, also an eccentric may be provided which, when being turned, will move the transverse bearing against the extension.

What I claim is:

1. In combination in a locking arrangement for use in connection with the building of mine shafts: a first cap having a transverse passage and also having a fork-shaped portion with open eyes therein, transverse bearing means mounted in said passage and provided with an inclined groove, a second cap provided with first stud means fixedly connected thereto and tiltably journalled in said eyes and also being provided with second stud means spaced from said first stud means and engaging said groove, clamping means separate from said bearing means and movable relative thereto, said clamping means extending through said passage and movable therein selectively in a first direction to thereby engage and exert a pressure upon said bearing means in a direction toward said first stud means to thereby vary the distance between the latter and said bearing means, said clamping means also being movable in the opposite direction for relieving the pressure upon said bearing means.

2. An arrangement according to claim 1, in which said clamping means is wedge-shaped and has a first surface substantially parallel to that surface of said bearing means which is adjacent thereto, said passage being provided with an inclined surface for engagement with a second surface of said clamping means inclined in conformity with the inclination of the inclined surface of said passage and located opposite to said first surface.

3. In combination in a locking arrangement for use in connection with the building of mine shafts: a first cap having a transverse passage and also having a fork-shaped portion with open eyes therein, transverse bearing means mounted in said passage and provided with an inclined groove, a second cap provided with first stud means fixedly connected thereto and tiltably journalled in said eyes and also being provided with second stud means spaced from said first stud means and engaging said groove, clamping means separate from said bearing means and movable relative thereto, said clamping means extending through said passage and movable selectively from a first end position into a second end position and vice versa, said second stud means being automatically guided in said groove when said clamping means is in one of said end positions, and said second stud means being outside said groove when said clamping means is in its other end position.

4. An arrangement according to claim 3, in which said clamping means is provided with at least two cranked inclined surfaces, and in which said first cap comprises means for engagement with said inclined surfaces to exert pressure on said transverse bearing means.

5. In combination in a locking arrangement for use in connection with the building of mine shafts: a first cap having a transverse passage and also having a fork-shaped portion with open eyes therein, transverse bearing means mounted in said passage and provided with an inclined groove, a second cap provided with first stud means tiltably journalled in said eyes and also being provided with second stud means spaced from said first stud means and engaging said groove, clamping means extending through said passage and movable selectively from a first end position into a second end position and vice versa, said clamping means being provided with at least two inclined surfaces inclined with regard to the longitudinal direction of said clamping means, and supporting means supported by said first cap for engagement with said inclined surfaces to uniformly exert clamping pressure on said bearing means in a direction transverse to the longitudinal direction of said bearing means.

6. An arrangement according to claim 5, in which said clamping means includes groove means for guiding at least portions of said wedge-shaped surfaces, and in which said inclined surfaces extend into said groove means, said supporting means being adapted in one of said end positions of said clamping means to engage said groove means.

References Cited in the file of this patent

UNITED STATES PATENTS 2,650,475    Gerlach _____ Sept. 1, 1953

FOREIGN PATENTS 1,135,845    France _____ May 3, 1957